United States Patent [19]

Williams

[11] Patent Number: 4,854,552

[45] Date of Patent: Aug. 8, 1989

[54] APPARATUS FOR RECOVERY OF SILVER FROM SPENT, WASTE, ACIDIC PROCESSING FLUIDS

[75] Inventor: James E. Williams, Fletcher, N.C.

[73] Assignee: E. I. Du Pont De Nemours and Company, Wilmington, Del.

[21] Appl. No.: 127,277

[22] Filed: Dec. 1, 1987

Related U.S. Application Data

[62] Division of Ser. No. 925,296, Oct. 31, 1986, Pat. No. 4,740,244.

[51] Int. Cl.[4] .................. C22B 13/03; C22B 15/12
[52] U.S. Cl. .................. 266/170; 75/118 R; 210/198.1
[58] Field of Search .............. 75/108, 109, 118 R, 75/118 P; 266/170, 101; 210/719, 723, 198.1, 440, 441, 266, 670, 667

[56] References Cited

U.S. PATENT DOCUMENTS

| | | | |
|---|---|---|---|
| 2,214,765 | 9/1940 | Holzwarth | 75/109 |
| 3,043,432 | 7/1962 | Megesi | 210/440 |
| 3,369,801 | 2/1968 | Hartman | 266/22 |
| 3,705,716 | 12/1972 | Hendrickson | 266/22 |
| 3,792,845 | 2/1974 | Larson et al. | 75/109 |
| 4,213,600 | 7/1980 | Thompson, Jr. | 266/170 |
| 4,303,441 | 12/1981 | Lamisse | 75/109 |
| 4,441,697 | 4/1984 | Peterson et al. | 266/170 |

FOREIGN PATENT DOCUMENTS 2106962 5/1972 France .
1353805 5/1974 United Kingdom .

Primary Examiner—Richard V. Fisher
Assistant Examiner—Cynthia L. Nessler

[57] ABSTRACT

Apparatus for recovery of silver from spent, waste acidic silver halide photographic processing fluid, e.g., fixer solution, comprising passing the fluid through finely divided iron e.g., steel wool, contained in a vessel in the presence of a metal salt of copper or cadmium, e.g., copper(II)sulfate, copper chloride dihydrate, cadmium sulfate, etc. The ratio of iron to metal salt is 25 to 1 to 4 to 1.

9 Claims, 1 Drawing Sheet

F I G. 1
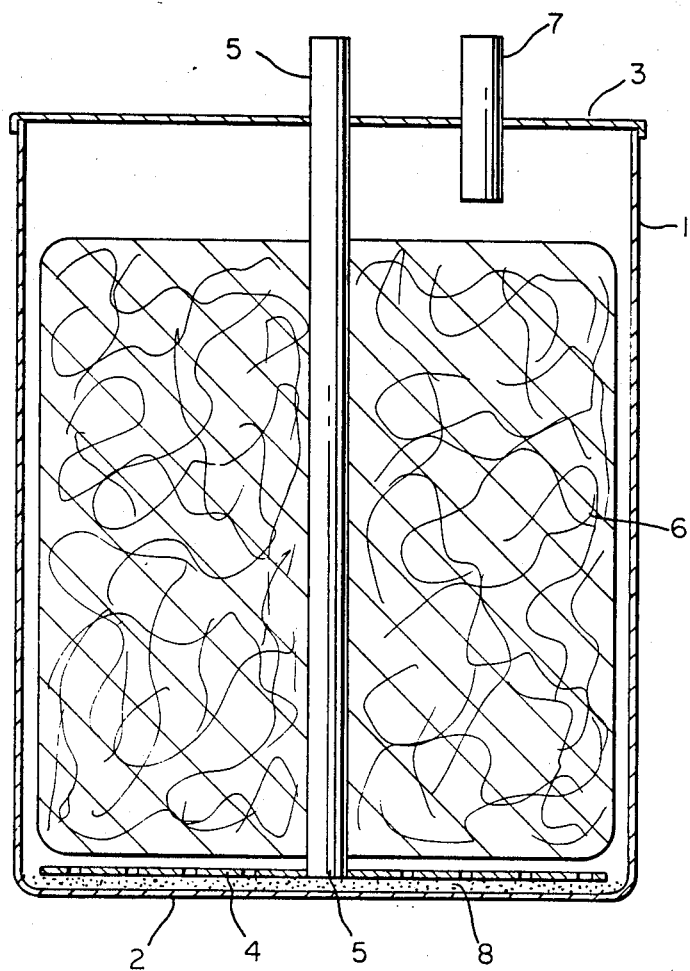

APPARATUS FOR RECOVERY OF SILVER FROM SPENT, WASTE, ACIDIC PROCESSING FLUIDS

This is a division of application Ser. No. 925,296, filed Oct. 31, 1986, now U.S. Pat. No. 4,740,244.

TECHNICAL FIELD

This invention relates to an apparatus for recovering silver from waste, acidic photographic processing fluids.

BACKGROUND OF THE INVENTION

Silver recovery from spent, photographic processing fluids is known. Primary among the processing fluids high in silver concentration is the so-called "fixer" solution. This solution is used to dissolve out the unexposed and thus undeveloped silver halide of a photographic element in order to "fix" the image. Fixer solutions are usually acidic, e.g., due to the presence of acetic acid. Since silver is an important resource, and is expensive, numerous methods of recovering silver have been developed. These methods include two basic systems, one depending on electrolytic methods and the second utilizing a chemical replacement by a baser and less expensive metal; i.e., a metal higher in the electromotive series than silver. Both systems have advantages and disadvantages. The electrolytic system consumes electricity and that too can be expensive and is inefficient, with the effluent solution containing 200 ppm or more of silver. The chemical replacement system is also not generally efficient. Both systems, in addition, tend to produce a black, finely divided solid precipitate known as "black sludge" that plugs and clogs the system, and the solution containing more silver thus bypasses the system and is lost. This lost silver is not only economically disadvantageous but also represents a pollution problem and thus is ecologically unsound.

There is a need for an improved process for recovering silver from waste, acidic photographic processing fluids which is more efficient, economical and ecologically sound.

SUMMARY OF THE INVENTION

In accordance with this invention there is provided an apparatus for the recovery of silver from spent, waste acidic silver halide photographic processing fluid comprising
A. a vessel made of material inert to the processing fluid having a flat bottom and a top;
B. a plate located in the bottom of the vessel capable of distributing the fluid to insure even flow of the fluid throughout the vessel;
C. finely divided iron at least substantially filling the vessel;
D. an inlet and an outlet to the vessel arranged so that processing fluid will enter the vessel through the inlet, flow under the bottom plate, and flow through the finely divided iron prior to exiting through the outlet; the improvement wherein prior to flow of the processing fluid through the vessel there is present in the vessel a minor amount with respect to the amount of finely divided iron of a metal salt wherein the metal is taken from the group consisting of copper and cadmium.

DESCRIPTION OF THE DRAWING

In the accompanying FIGURE forming a material part of this disclosure wherein:
FIG. 1 is a vertical cross-sectional view of an embodiment of a silver recovery apparatus taken through the center of the apparatus.

DETAILED DESCRIPTION OF THE INVENTION

With reference to FIG. 1 there is shown a vertical cross-sectional view of a preferred mode of a silver recovery apparatus wherein the vessel 1 has a flat bottom 2 and a top 3 which can be removable. Alternatively, the top can be fixedly attached to vessel 1 so that it must be cut in order to be removed. Located in the bottom area of the vessel 1 is a plate 4 preferably containing perforations, the plate being capable of dispersing spent, waste acidic silver halide photographic processing fluid that enters the vessel 1 through inlet 5. Above the plate 4 the vessel is at least substantially filled with finely divided iron 6, e.g., in the form of steel wool. An outlet 7 is present in the vessel for removal of the substantially silver free processing fluid in the vessel 1. A copper or cadmium metal salt 8, which may be in dry form or present as a solution, e.g, aqueous solution; is present in the vessel 1, generally located in the area below plate 4. The design of the apparatus can vary but the spent, waste photographic processing fluid must be capable of entering the vessel and come in sufficient contact with the finely divided iron and metal salt prior to exiting from the vessel to remove at least a substantial amount of silver from the spent, waste photographic processing fluid.

The apparatus can be used as part of an automatic processing unit. Several apparatus are utilized, e.g., up to five or more, if necessary. The processing fluid enters into one apparatus of the type described above and flows, e.g., by pumping means, by gravity forces, etc., consecutively through a series of similar apparatus. After leaving the last apparatus the processing fluid may pass through a silver detector device which measures the remaining silver in the processing fluid. In the automatic processing unit, one or more individual recovery apparatus may be replaced as sufficient silver is reclaimed.

The vessel 1, plate 4, inlet tube 5 and outlet tube 7 are made of materials which are inert to the acidic silver halide photographic processing fluid. Inert plastic is a preferred type of material but other materials known to those skilled in the art can be used including metal. As set out above, the finely divided iron 6 preferably is present in the form of steel wool. Woven steel screen wire and wound steel wire may also be used. The vessel is preferably essentially filled with the finely divided iron 6 above plate 4. The metal salt 8, whether solid or in solution is preferably present at the bottom of vessel 1 under plate 4 in minor amount relative to the finely divided iron 6. Metal salts that have been found to be useful in combination with the finely divided iron include: copper sulfate, copper(II)chloride dihydrate, cadmium sulfate, as well as other copper and cadmium salts. Copper salts, e.g., copper sulfate pentahydrate, are preferred primarily because they are less expensive. The anionic portion of the salt does not appear to be critical for practical useful results. The ratio of finely divided iron to metal salt ranges from 25 to 1 to 4 to 1 weight to weight. By way of illustration but not limitation, 500 g to 2,500 g of the metal salt are present in combination with 24 pounds (~10.886 g) of finely divided iron. A preferred amount of copper sulfate pentahydrate is 1,000 g per 24 pounds (~10,886 g) of steel wool.

In practicing the invention, spent, waste silver halide photographic processing fluid, which may be acidic due to the presence of acetic acid or sulfuric acid, acetic acid mixtures, is passed into the vessel 1 through inlet 5 whereby the processing fluid flows into the area of the vessel below plate 4 which, preferably being perforated, permits the processing fluid to be evenly dispersed first over the metal salt 8 and then up through the finely divided iron 6. Subsequently the processing fluid leaves the apparatus through outlet 7. The amount of time that the processing fluid takes as it passes through the apparatus depends on variables such as concentration of silver, geometry and size of the collecting apparatus, flow through rate, etc. The residual time is best defined by silver analysis of the effluent and can vary widely. At this point, the processing fluid will have substantially no dissolved silver therein and can be safely, economically and ecologically disposed. Previous silver recovery systems do not utilize a metal salt according to the present invention, and thus these systems are not as efficient. When exhausted the dry contents of a prior art vessel may contain 30 to 70% silver and, in addition, much black sludge. The addition of a metal salt, e.g., copper sulfate, improves the utility of the present system by reducing black sludge and other deleterious by-products and increases silver analysis to 90% and more. In addition, the use of metal salt preserves the initial structure of the finely divided iron, e.g., steel wool, thereby preventing plugging and channeling, inhibits side reactions and enhances the plating of iron with silver. Thus the process of this invention, and the improvement noted which makes the silver recovery and disposal of the processing fluid economical and ecologically sound, is not described in the prior art nor could it be predicted from a knowledge thereof. A preferred mode of the invention is described in Example 1.

INDUSTRIAL APPLICABILITY

The instant invention due to the presence of the copper and cadmium metal salts provides an improved process for recovering silver from spent, waste, acidic silver halide photographic processing fluids, e.g., fixer solution as well as other acidic solutions containing dissolved silver. Typically these fluids contain acetic acid, relatively large amounts of thiosulfate, sulfite, bromide, sodium and possibly some tetrathionate ions, etc. The presence of the relatively small amount of metal salt in the silver recovery apparatus surprisingly improves the utility of silver recovery by not only reducing the amount of black sludge formed as well as other deleterious by-products but has been found to increase the silver analysis to 90% by weight or more. The initial structure or form of the finely divided iron, e.g., steel wool, is also retained so that channeling and plugging is avoided. The process and apparatus are easily adaptable into an automatic processing unit. By way of illustration, exposed, photographic elements are sent into these processors and carried along via rollers and the like through developer, wash, fixer, and wash solutions and the films then automatically dried. Conventionally fresh developer and fixer (replenishment) are added at rates determined by film throughput and some spent fluids are withdrawn simultaneously. The spent fixer, which is acidic in nature, contains the highest amount of dissolved silver halide and it is this fluid to which this invention is primarily drawn. Since this waste stream contains such a large amount of silver, and since silver is expensive, it is highly desirable economically to recover this silver in the purest form possible. Additionally, it is ecologically unsound to dispose of any fluids which contain such a large amount of dissolved silver therein. In fact, it is usually illegal to dispose of this waste in any of the conventional waste facilities. Thus, there is such a pressing need to recover this dissolved silver. This invention solves this problem in a neat, efficient manner.

EXAMPLES

The invention will now be illustrated but not limited by the following examples wherein the percentages are by weight.

EXAMPLE 1

Several tests of the process of this invention were made using commercially available silver recovery cannisters. Typically, these systems are 15 gallon (~57 liter) cannisters (Kodak ® Type 3) containing a 15 inch (38.1 cm) high, 24 lb (~10.09 kg) donut of commercial grade steel wool. Several cannisters were used in this example. One (control) was used as purchased. To the others, various amounts of solid $CuSO_4.5H_2O$ were added. Typical flow rates of spent silver halide photographic fixer solution through the cannisters were about 10 gallons (~38 liters) of spent fixer solution per hour which typically contained 5400 ppm of soluble silver as the thiosulfate complex anion. Completion of the displacement reaction and, hence, exhaustion of the available iron in the cannister was made by monitoring the amount of silver in the effluent stream by atomic absorption spectroscopy. The volume of the cannisters used is proportional to the throughput.

In control tests using unaltered steel wool (the control), the initial 15 inch (38.1 cm) high donut of steel wool typically collapsed to a mass of mixed silver fibrils and black sludge of about 5 inches (12.7 cm) in height and silver effluent values began to climb to unacceptably high values. A typical yield was 29 lb (13.15 kg) of dry product containing about 70% silver (e.g. ca. 20.3 lb (9.2 kg) of recoverable silver).

Cannisters representing this invention, e.g., containing 1000 grams of copper sulfate pentahydrate added to the cannisters as dry solid before the introduction of the spent fixer, provided the following results:
A. 30 to 31 lb (13.6 to 14.06 kg) of dry product containing 90–95% pure silver (e.g., ca. 28 to 29 lb (12.7 to 13.15 kg) of recoverable silver).
B. Essentially no black sludge.
C. The input 15 inch (38.1 cm) high donut of steel wool was lowered about 2 to 3 inches (5.08 to 7.62 cm) and was comprised of bright silver fibrils of the same structure as the input donut of steel wool. Thus, silver could be easily recovered.
D. On-line usage of the cannisters containing the steel wool and the copper sulfate was considerably extended relative to that of the control cannister.

The output silver from the improved process is pure enough to be refined for reclamation of silver values without the intermediate steps required for the control material.

EXAMPLE 2

Copper(II)chloride dihydrate, used at approximately equal cooper(II) ion concentration to that supplied by copper(II)sulfate pentahydrate, was tested and found to yield substantially equivalent improvement in silver plating efficiency when added to steel wool as a dry solid and then flooded with spent photographic fixer as described in Example 1.

5.0 grams of steel wool was placed in a 130 ml plastic beaker and the appropriate salt added as shown below.

| Salt Added | Amount Grams | Moles |
| --- | --- | --- |
| $CuSO_4.5H_2O$ | 1.56 | 0.0062 |
| $CuCl_2.2H_2O$ | 1.00 | 0.0059 |

The mixture was covered with 100 g of spent photographic fixer containing 3600 ppm of silver in the form of its thiosulfate anion complex. The mixture was allowed to remain in contact on a back-and-forth motion shaker for 1.5 hours. The fixer was then drained off and analyzed for silver using atomic absorption spectrophotometer and standard techniques. A second fixer charge was then added and the process repeated with no further addition of copper salt. In similar manner, a third fixer charge was added. Silver ion analysis of the effluent is shown below.

| Salt Added | Silver in Effluent (ppm) | | | |
| --- | --- | --- | --- | --- |
| | 1st Soak | 2nd Soak | 3rd Soak | Mean |
| $CuSO_4.5H_2O$ | 0.87 | 32.4 | 10.8 | 14.7 |
| $CuCl_2.2H_2O$ | 0.47 | 6.8 | 17.9 | 8.4 |

Both salts caused approximately equivalent removal of silver. In both cases, the liquor was clear and colorless, the steel wool was uniformly plated with bright silver and structurally intact, and there was only a small amount of black sludge, finely divided solid black precipitate formed. A control using only steel wool was effective in removing silver (e.g. 10.2 ppm mean) but contained black sludge, had a black effluent solution and the steel wool was structurally degraded.

EXAMPLE 3

A series of tests, similar to those described in Example 2, above, were made. 5.0 g of steel wool containing added solid salts of various cations were contacted with successive 100 g portions of spent photographic fixer containing 3600 ppm of complexed silver. The technique described in Example 2, above, was employed. Results of this series are given in Table 1 below.

TABLE 1

| Metal Salt Added | Amount (moles) | Silver in Effluent (ppm) | | | |
| --- | --- | --- | --- | --- | --- |
| | | 1st Soak | 2nd Soak | 3rd Soak | Mean |
| None (control)[1] | — | 22.7 | 4.07 | 4.23 | 10.3 |
| $CuCl_2.2H_2O$[2] | 0.0059 | 0.47 | 6.8 | 17.9 | 8.4 |
| $CoSO_4.7H_2O$[3] | 0.0069 | 39.0 | 36.1 | 22.1 | 32.4 |
| $Pb(NO_3)_2$[4] | 0.0019 | 10.1 | 20.8 | 74.0 | 33.7 |
| $K(SbO)C_4H_4O_6.\frac{1}{2}H_2O$[5] | 0.0033 | 2.17 | 3.78 | 34.1 | 13.3 |
| $NiSO_4.6H_2O$[6] | 0.0069 | 41.6 | 40.2 | 37.7 | 39.8 |
| $SnSO_4$[7] | 0.0034 | 14.7 | 27.6 | 28.3 | 23.5 |
| $Bi(NO_3)_3.5H_2O$[8] | 0.0019 | 21.5 | 44.6 | 117.0 | 61.0 |

TABLE 1-continued

| Metal Salt Added | Amount (moles) | Silver in Effluent (ppm) | | | |
| --- | --- | --- | --- | --- | --- |
| | | 1st Soak | 2nd Soak | 3rd Soak | Mean |
| $CdSO_48/3H_2O$[9] | 0.0107 | 4.05 | 3.07 | 9.1 | 5.4 |

[1] Control gave a black effluent solution, much black sludge and steel wool structural degradation.
[2] Clear colorless solution, bright silver plating on structurally intact steel wool and tolerable amount of black sludge.
[3] No bright metal plating, effluent solution somewhat cloudy and some steel wool degradation.
[4] Clear solution, bright metal plating with no structural degradation of steel wool and little black sludge.
[5] Like [1] above.
[6] Yellow-green effluent, some bright metal plating, minimal steel wool degradation and some black sludge.
[7] Clear solution but substantially more black sludge than [2] above.
[8] Clear solution with some black sludge formation and some steel wool degradation.
[9] Like [4] above.

This example demonstrates that of the various metal salts only copper and cadmium salts are useful in removing sufficient silver from the effluent without other disadvantages.

EXAMPLE 4

A series of experiments was performed to define the optimum amount of copper(II)sulfate pentahydrate to add to steel wool. This example used experimental processes similar to that described in Example 2, but employed four fixer charge additions. Other experimental parameters were: 100 ml of spent photographic fixer containing 5400 ppm silver as the soluble complex, contact time 1.5 hours on a shaker; and 5.0 g steel wool. Results of these tests are shown in Table 2 below.

TABLE 2

| Metal Salt Added (g) | Silver in Effluent (ppm) | | | | |
| --- | --- | --- | --- | --- | --- |
| | 1st Soak | 2nd Soak | 3rd Soak | 4th Soak | Mean |
| 0 | 13 | 7.4 | 2.70 | 2.06 | 6.3 |
| 100 | 4 | 2.9 | 2.64 | 2.03 | 2.9 |
| 200 | 2 | 1.46 | 1.61 | 1.48 | 1.6 |
| 300 | 1 | 0.79 | 1.37 | 1.99 | 1.3 |
| 400 | 1 | 1.42 | 2.89 | 1.62 | 1.7 |
| 500 | 0 | 1.78 | 3.30 | 3.83 | 2.2 |
| 800 | 0 | 1.26 | 3.03 | 16.0 | 5.1 |
| 1000 | 0 | 1.23 | 4.04 | 8.75 | 3.5 |

In this test, it is seen that 300 mg of the salt gives optimum performance.

I claim:

1. An improved apparatus for the recovery of silver from spent, waste acidic silver halide photographic processing fluid comprising
   A. a vessel made of material inert to the processing fluid having a flat bottom and a top;
   B. a plate located in the bottom of the vessel capable of distributing the fluid to insure even flow of the fluid throughout the vessel;
   C. finely divided iron at least substantially filling the vessel;
   D. an inlet and an outlet to the vessel arranged so that processing fluid will enter the vessel through the inlet, flow under the bottom plate, and flow through the finely divided iron prior to exiting through the outlet;
   E. the improvement wherein prior to flow of the processing fluid through the vessel there is present in the vessel, below plate (B), means for further enhancing the recovery of silver, said enhancing means comprising a minor amount with respect to the amount of finely divided iron of a metal salt wherein the metal is selected from the group consisting of copper and cadmium, and the ratio of finely divided iron to metal salt is 25 to 1 to 4 to 1.

2. An apparatus according to claim 1 wherein finely divided iron essentially fills the vessel above the plate (B).

3. An apparatus according to claim 1 wherein the plate (B) is perforated.

4. An apparatus according to claim 1 wherein the finely divided iron is in the form of steel wool.

5. An apparatus according to claim 1 wherein the metal of the salt is copper.

6. An apparatus according to claim 1 wherein the metal of the salt is cadmium.

7. An apparatus according to claim 5 wherein the metal salt is copper(II)sulfate.

8. An apparatus according to claim 6 wherein the metal salt is cadmium sulfate.

9. An apparatus according to claim 5 wherein the metal salt is copper(II)chloride dihydrate.

* * * * *